United States Patent Office 3,513,070
Patented May 19, 1970

3,513,070
NUCLEAR POWER PLANT CONTAINING AT LEAST ONE LIGHT WATER NUCLEAR REACTOR AND ONE HEAVY WATER NUCLEAR REACTOR
Peter Heinrich Erwin Margen, Nasbypark, and Karl Goran Ernst Froman, Solna, Sweden, assignors to Aktiebolaget Atomenergi, Stockholm, Sweden, a company of Sweden
Filed Dec. 12, 1967, Ser. No. 689,938
Claims priority, application Sweden, Dec. 16, 1966, 17,306/66
Int. Cl. B41b 3/06
U.S. Cl. 176—31                                    8 Claims

ABSTRACT OF THE DISCLOSURE

Partially burned-up fuel cartridges are transferred from a light water nuclear reactor to a heavy water nuclear reactor for a complete burn-up. The cartridges have a square or hexagonal cross-section, and they are placed in tubes having a circular cross-section in the heavy water reactor. Consequently, there will be heat insulating spaces between the cartridge and the tube, preventing an undesired heating of the moderator.

---

Figure 1:
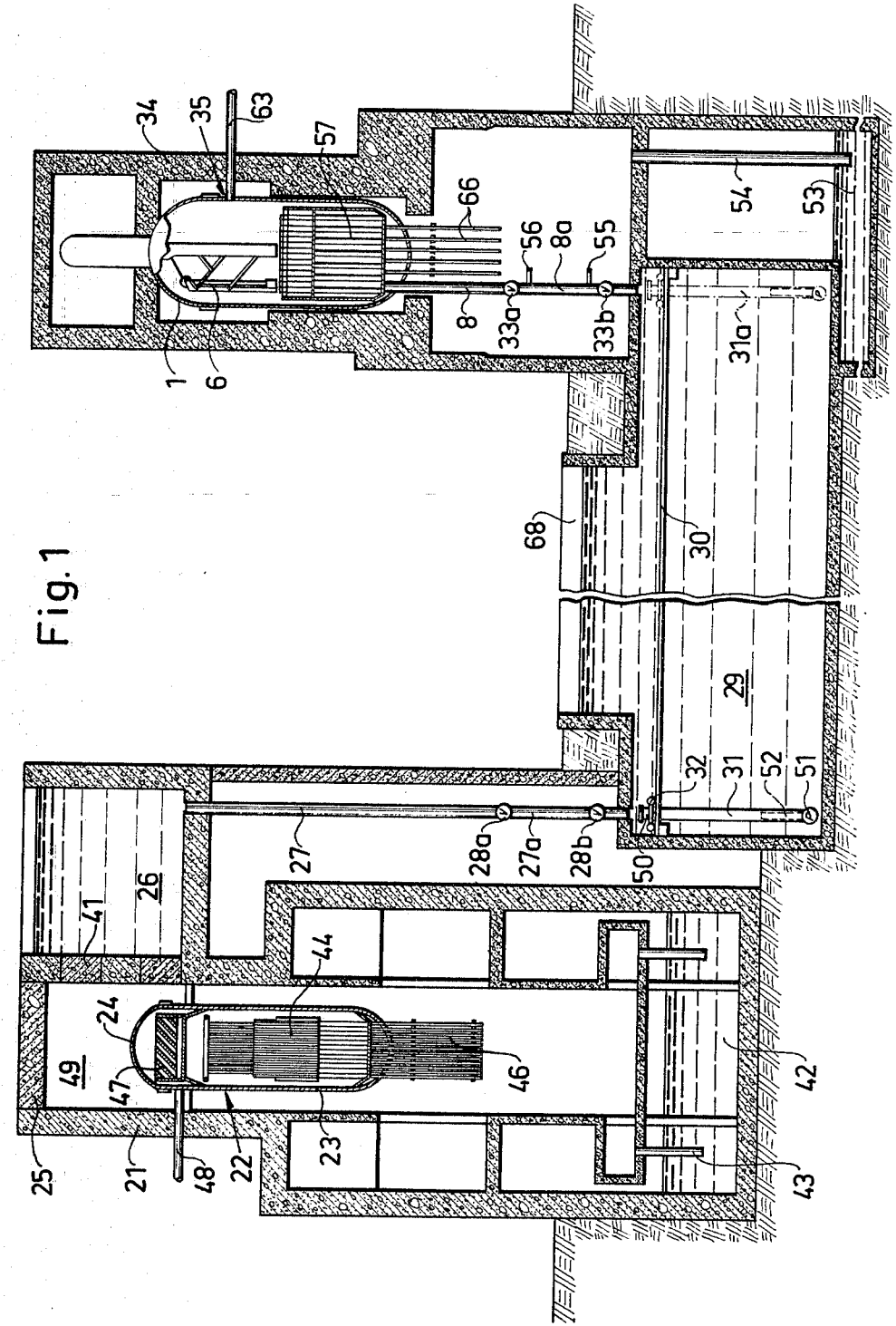

The invention is concerned with a nuclear power plant containing at least one light water nuclear reactor and one heavy water nuclear reactor and means for transferring used (burned-up) nuclear fuel from the light water reactor to the heavy water reactor for continued use (burn-up). The term "light water nuclear reactor" is used in this specification to define a nuclear reactor which contains light water, that is ordinary water, $H_2O$, as coolant and moderator. The term "heavy water nuclear reactor" denotes a nuclear reactor containing heavy water, $D_2O$, as coolant and moderator.

The invention is based upon the known fact that heavy water is a better moderator than light water.

Nuclear fuel which has been irradiated in a light water reactor until it does no longer contain any reactivity, gains a new reactivity if it is transferred into a heavy water reactor, thus making a continued burn-up possible. A direct transfer of a used fuel cartridge from a light water reactor to a heavy water reactor has not been considered possible, due to the large dissimilarities between the two types of reactors. Known light water reactors usually make use of fuel cartridges having a comparatively large number of fuel rods (for instance 64 rods) mounted in a square pattern in a casing having a square cross-section. Known heavy water reactors usually make use of fuel cartridges containing a considerably lower number of fuel rods (19 to 37) mounted in a circular pattern so as to fit in cylindrical tubes which are usually stationary in the reactor. The refuelling of a light water reactor takes place after the reactor has been shut off, and the top of the reactor has been removed. In a heavy water reactor the refuelling takes place during operation, which requires a complicated refuelling machine. Another difference is that the size of the reactor core is considerably larger in a heavy water reactor than in a light water reactor.

It has been suggested that used fuel cartridges from a light water reactor should be taken apart, and that the fuel rods should be reassembled into a circular pattern to form cartridges useful for a heavy water reactor, see K. H. Campbell: "Tandem Fuelling of Thermal Reactors," ANS conference in Gatlinburgh, June 1965. This suggestion results in an increased burn-up of the fuel, but it also involves difficult operations of the irradiated fuel, which has become brittle and radioactive by the irradiation.

It is the main object of the invention to provide a nuclear power plant in which burned-up fuel cartridges from a light water reactor can be used for a continued burn-up in a heavy water reactor without having been disassembled and reassembled. Another object of the invention is to provide a heavy water reactor which is suitable for receiving fuel cartridges of the type usually used in light water reactors, and making it possible to exchange the fuel cartridges during the operation of the heavy water reactor.

The nuclear power plant of the invention comprises at least one nuclear reactor cooled and moderated by light water and at least one nuclear reactor cooled and moderated by heavy water, and means for transferring partially burned-up nuclear fuel cartridges from the light water reactor to the heavy water reactor for a complete burn-up, the nuclear fuel cartridges consisting of a plurality of fuel rods mounted in a casing having a square or hexagonal cross-section, the heavy water reactor containing a plurality of fuel cartridge tubes having a circular cross-section and having a dimension sufficient for receiving the fuel cartridges, the spaces thus formed between the fuel cartridge and the fuel cartridge tube serving as a heat insulation between the fuel cartridge and the moderator outside the fuel cartridge tube.

Figure 2:
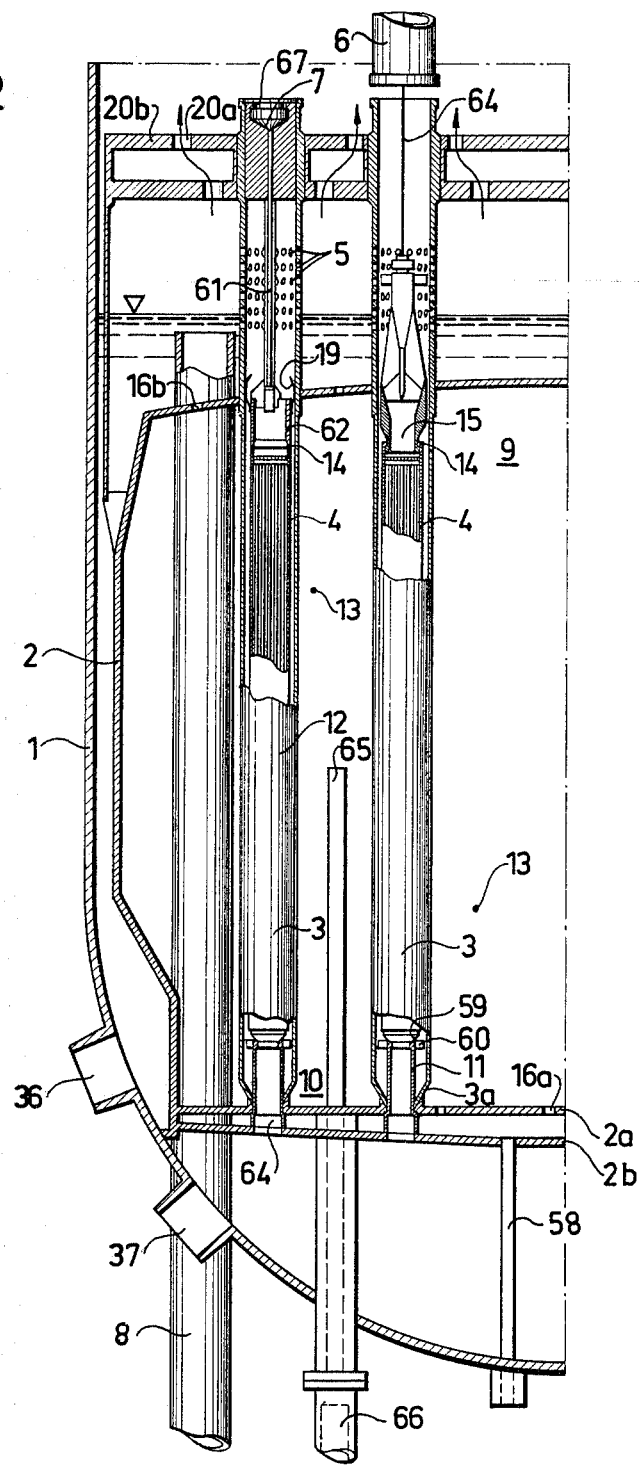
Figure 3:
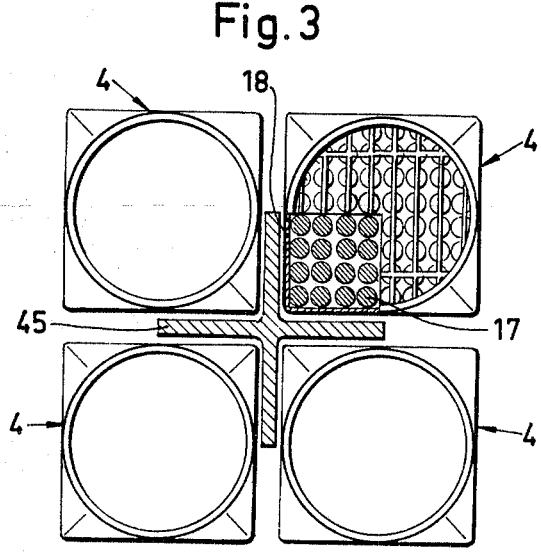
Figure 4:
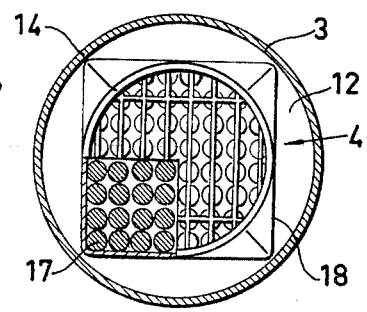
Figure 5:
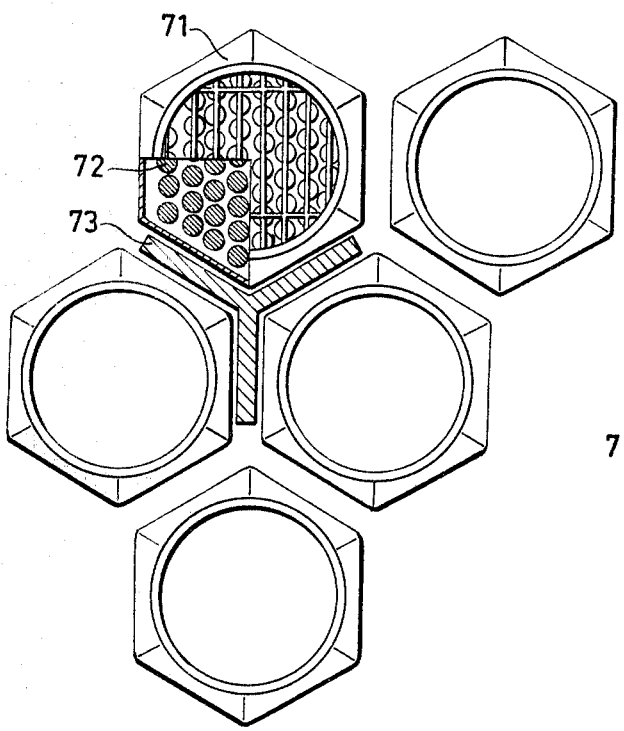
Figure 6:
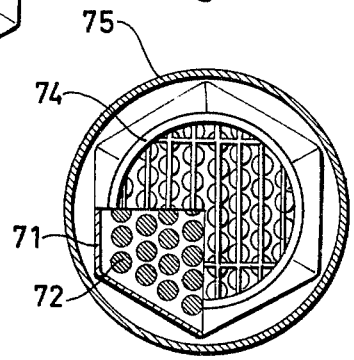

The invention will now be described with reference to the accompanying drawings. FIG. 1 illustrates a nuclear power plant according to the invention. FIG. 2 illustrates a portion of the heavy water reactor of the nuclear power plant of FIG. 1. FIG. 3 illustrates a cross-sectional view of a portion of the core of the light water reactor of FIG. 1. FIG. 4 illustrates a cross sectional view of one fuel tube and one fuel cartridge of the heavy water reactor of FIG. 2. FIG. 5 illustrates fuel cartridges having a hexagonal cross section, and situated in the core of a light water reactor. FIG. 6 illustrates a fuel cartridge of FIG. 5 after having been transferred into the fuel tube of a heavy water reactor.

The nuclear power plant of FIG. 1 contains a concrete building 21 for a nuclear reactor 22 which is cooled and moderated by means of light water. The concrete building 21 has a top wall 25 which can be removed. A light water tank 26 is provided in the top of the building, and the wall 41 between the tank 26 and the reactor space can be demounted and remounted. The bottom portion of the building 21 contains a light water tank 42, communicating with the reactor space through pipes 43. If, as a result of an accident, steam should enter into the reactor space, said steam will flow through the pipes 43 down into the water in the tank 42. The water condenses the steam, and thus prevents a dangerous increase of pressure in the building. the reactor contains a pressure vessel 23 having a top 24 which can be removed. The light water reactor is of a known type, and therefore it is only to be briefly described here. The nuclear fuel is situated in the reactor core 44. The fuel consists of fuel rods 17, mounted in a casing 18 to form fuel cartridges 4 having a square cross section, see FIG. 3. In order to control the power of the reactor neutron absorbing control rods 45, having a cross-shaped cross section, are provided in the spaces between the fuel cartridges 4. The control rods 45 can be moved into and out of the reactor core by means of a control rod machinery 46. The steam produced in the reactor passes through a water droplet separator 47 and leaves the reactor through a pipe 48.

When the fuel has been burned up to the desired degree the top wall 25 of the concrete building 21 is removed, and light water is supplied to the upper portion 49 of the reactor space up to the same level as the water in the tank 26. The wall 41 is now demounted, the top 24 of the pressure vessel is removed, and the fuel cartridges are lifted by means of a refuelling machine, not shown, into the water-filled tank 26. By means of said refuelling machine the fuel cartridges are lowered from the tank 26 through a pipe 27 having double valves 28a and 28b into the lower portion 27a of the tube 27. The valve 28a is now closed and the valve 28b is opened, and the fuel cartridge is further lowered into a tubular container 31 situated in a water-filled tank 29. The containers 29 are suspended on carriages 32 mounted on rails 30, making it possible for the containers and the fuel cartridges therein to be transported from one end of the tank to the other. The carriages 32 are propelled by means of an electric motor 50 receiving electric current through the rails 30. The lower portion of the tubular container 31 contains a telescopic lifting member 52 which can be lifted so as to receive a fuel cartridge from the tube portion 27a and to lower it into the container 30. The telescopic lifting means 52 is driven hydraulically by means of a pump 51, which is rotated by an electric motor receiving electric current from the rails 30.

Adjacent the tank 29 is a concrete building 34 for a heavy water nuclear reactor 35. The bottom portion of the concrete building 34 contains a heavy water tank 53, communicating with the reactor space through a pipe 54. The water serves as a condensing and pressure reducing means in the event of an accident.

The heavy water reactor 35 contains a pressure vessel 1 containing in its upper portion a refuelling machine 6. By means of this refuelling machine fuel cartridges can be moved into and out of the reactor through a tube 8 containing double valves 33a and 33b. After the tubular container 31 has been brought into the position 31a, in which it is coaxial with the tube 8, the fuel cartridge is lifted, by means of the lifting member 52, into the tube portion 8a between the valves 33a and 33b. Light water still adheres to the fuel cartridge. Said light water is removed by heavy water being supplied through a pipe 55 and being withdrawn through a pipe 56. The valve 33a is now opened, a grab belonging to the refuelling machine 6 is lowered into the tube 8 and brought into engagement with the fuel cartridge, and the fuel cartridge is lifted into its desired position in the reactor core 57. The tanks 26 and 29 and the tubes 27 and 8 thus constitute a channel through which fuel cartridges can be transported in water from the light water reactor to the heavy water reactor.

The heavy water reactor, see FIG. 2, contains a tank 2 for the water 13 acting as moderator. The tank 2 has double bottoms 2a, 2b. Comparatively cold feed water is supplied through a tube 58 to the space between the walls 2a and 2b, enters the tank 2 through openings 16a, and leaves the tank 2 through openings 16b in the top wall of the tank.

A large number of fuel tubes 3 having a circular cross-section are mounted in the tank 2 so as to seal against the top and bottom walls. The fuel tubes remain in the tank during the exchange of the fuel cartridges 4. The fuel cartridges have been briefly described with reference to FIG. 3. They have a conical bottom portion 59, and their upper portion is shaped as a circular collar 14. The fuel tubes 3 have a diameter sufficient for the tubes to contain the fuel cartridges with some clearance. The portion of the fuel tubes extending above the tank 2 contains openings 5 situated above the water surface and serving as separators for the steam-water-mixture. The upper portion of the fuel tubes 3 contains a plug 7 to protect the upper portion of the reactor from radiation from the fuel cartridges. The plug 7 is provided with a rod 61, and the lower end of this rod supports a tubular member 62. The lower edge of said tubular member 62 rests on the collar 14 of the fuel cartridge. Spring members 19 on the tubular member 62 serve to guide the tubular member in the fuel tube 3. The steam originating from the openings 5 flows through openings 20a in a double partition 20b supporting the upper ends of the fuel tubes 3, and is withdrawn from the reactor through a steam outlet 63. The water originating from the openings 5 mixes with the moderator water originating from the openings 16b, and the mixture flows down along the wall of the pressure vessel 1. The water now flows through an outlet 36 to a circulating pump, not shown, and is pumped back to the pressure vessel through an inlet 37. The water now flows up through openings 64 in the reflector vessel bottom 2a, 2b, and flows up through the fuel cartridges 4, inside the casing 18, while being brought to boil.

The power of the heavy water reactor 35 is controlled in a known way by means of neutron absorbing rods 65 moved into and out of the core by a control rod mechanism 66.

In order to make the height of the reactor core (extrapolated core height) as large as possible while using comparatively short fuel cartridges, the top and the bottom portions of the tank contains thick layers 9, 10 of a heavy water reflector. The conical bottom portion 59 of the fuel cartridge rests upon a tubular support 11 which is fastened to the conical bottom portion 3a of the fuel tube 3. The upper end of the tubular support 11 carries radial supports 60 engaging the wall of the tube 3. The members 11 and 60 should preferably consist of a material having a low absorption of neutros, such as a zirconium alloy, so as to make the reflector effective. The conical bottom portion 59 of the fuel cartridge 4 is in sealing engagement with the tubular support 11, resulting in a space 12 being formed between the fuel tube 3 and the casing 18. Said space is filled with stagnant water, and said water insulates the fuel cartridge, containing boiling water, from the comparatively cold moderator 13 between the fuel tubes 3. The reason why the moderator should have a considerably lower temperature than the boiling coolant is that a low moderator temperature results in superior moderating characteristics.

FIG. 2 also shows the lower portion of the refueling machine 6. This machine contains a grab 15, suspended in a wire 64. The grab 15 is of any known type designed to seize the upper circular collar 14 of the fuel cartridge. The angular position of the grab relative to the fuel cartridge is unimportant, owing to the fact that the grab engages the circular collar 14. The angular position of the fuel cartridge 4 in the fuel tube 3 is also unimportant, owing to the fact that the lower portion of the fuel cartridge is designed as a conical member 59.

Before a fuel cartridge 4 can be lifted out of the fuel tube 3 the plug has to be removed. This is done by means of the refuelling machine 6, the grab 15 engaging a recessed portion 67 in the top of the plug 7. The plug 7 is placed in a pocket, not illustrated, inside the reactor during the refuelling operation, and is replaced in the fuel tube 3 after a new fuel cartridge has been inserted.

The fuel cartridges used in the nuclear power plant of this invention should preferably contain a larger number of fuel rods than if the cartridges were designed merely for use in a heavy water reactor. In order that said fuel cartridges shall not produce a so-called positive void coefficient in the heavy water reactor the ratio of the volume of the moderator between the fuel tubes to the volume of the fuel should be comparatively low. A value below 12 is preferred, whereas a normal value for a heavy water reactor is 15–20.

When a fuel cartridge has been burned-up to the desired degree in the heavy water reactor 35 it is removed from the reactor under operation by means of the refuelling machine 6, and is placed in a tubular container 31, the operations described above being carried out in the reverse order. The fuel cartridge may be stored, if desired, in the tank 29 for some time, and is then removed from the tank through its top opening 68.

Alternatively, the fuel cartridges may have a hexagonal cross-section, as illustrated in FIGS. 5 and 6. The fuel rods 72 are situated in a hexagonal pattern, and they are surrounded by a hexagonal casing 71. The top of the casing is shaped as a cylindrical collar 74, to enable the cartridge to be seized by a grab similar to the grab 15 of FIG. 2. The bottom portion of the casing has a conical member similar to the member 59 of the cartridge 4 as illustrated in FIG. 2. When the fuel cartridge is situated in the light water reactor, adjacent cartridges are placed comparatively close to each other, see FIG. 5. Neutron-absorbing control rods 73 consisting of three fins making 120° angles are provided in the space between adjacent fuel cartridges. The control rods 73 can be moved by a machinery, not illustrated. When the fuel cartridge is moved to the heavy water reactor it is placed in a fuel tube 75 having a circular cross-section, see FIG. 6. The six spaces between the casing 71 and the tube 75 contain stagnant water and thus constitute a heat insulation between the fuel cartridge and the moderator surrounding the fuel tube 75.

What is claimed is:

1. A nuclear power plant, comprising at least one nuclear reactor cooled and moderated by light water and at least one nuclear reactor cooled and moderated by heavy water, and means for transferring partially burned-up nuclear fuel cartridges from the light water reactor to the heavy water reactor for a complete burn-up, the nuclear fuel cartridges consisting of a plurality of fuel rods mounted in a casing having a square or hexagonal cross-section, the heavy water reactor containing a plurality of fuel cartridge tubes having a circular cross-section and having a dimension sufficient for receiving the fuel cartridges, the spaces thus formed between the fuel cartridge and the fuel cartridge tube serving as a heat insulation between the fuel cartridge and the moderator outside the fuel cartridge tube.

2. A nuclear power plant as claimed in claim 1, in which the lower end of the fuel cartridge has a conical member designed to engage a cooling water inlet tube in the lower end of the fuel cartridge tube, thus creating insulating spaces of stagnant water between the fuel cartridge and the fuel cartridge tube.

3. A nuclear power plant as claimed in claim 2, in which the heavy water reactor contains a tank for the heavy water moderator, said tank comprising a side wall and top and bottom walls, the fuel cartridge tubes extending through said moderator tank, the length of the fuel cartridges being less than the height of the moderator tank, thus creating a top reflector and a bottom reflector in the moderator tank.

4. A nuclear power plant as claimed in claim 3, in which the height of said bottom reflector is defined by said water inlet tubes, the lower ends of said water inlet tubes being fastened to the bottom wall of the reflector tank.

5. A nuclear power plant as claimed in claim 1, in which a light water tank is provided between the light water reactor and the heavy water reactor, said light water tank containing transport means for transporting the fuel cartridges from the light water reactor to the heavy water reactor.

6. A nuclear power plant as claimed in claim 5, in which the transport means in said light water tank comprise rails, carriages on said rails, means for moving the carriages on the rails, tubular containers suspended on said carriages, and hydraulic lifting members in said carriages for lifting the fuel cartridges into and out of said tubular containers.

7. A nuclear power plant as claimed in claim 5, in which the heavy water reactor communicates with the light water tank through a pipe containing double valves, means being provided for rinsing the fuel cartridge, while situated in said pipe between said valves, with heavy water.

8. A nuclear power plant as claimed in claim 3, in which the cross-sectional area of the moderator in the moderator tank outside the fuel cartridge tubes is less than 12 times the cross-sectional area of the fuel.

References Cited

Transactions of A.N.S., 1965, vol. 8, No. 1, p. 135.

CARL D. QUARFORTH, Primary Examiner

H. E. BEHREND, Assistant Examiner

U.S. Cl. X.R.

176—78, 38, 51